United States Patent
Mohns

(10) Patent No.: US 8,240,494 B1
(45) Date of Patent: *Aug. 14, 2012

(54) BULK MATERIAL CONTAINER WITH ADAPTABLE BASE

(76) Inventor: Brad Mohns, Jackson, MN (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/093,366

(22) Filed: Apr. 25, 2011

Related U.S. Application Data

(63) Continuation-in-part of application No. 12/512,442, filed on Jul. 30, 2009, now Pat. No. 8,083,083.

(51) Int. Cl.
*B65D 88/00* (2006.01)
*B65D 25/24* (2006.01)

(52) U.S. Cl. ............... 220/1.5; 220/4.03; 220/636

(58) Field of Classification Search ............. 220/1.5, 220/4.03, 4.26, 636; 222/160; 239/661
See application file for complete search history.

(56) References Cited

U.S. PATENT DOCUMENTS

| | | | |
|---|---|---|---|
| 2,299,702 A | 4/1941 | Mosel | |
| 2,675,947 A | 10/1942 | Wynn | |
| 3,083,879 A | 4/1963 | Coleman | |
| 3,883,005 A | 5/1975 | Stevens | |
| 4,071,226 A | 1/1978 | Miller | |
| 4,302,043 A | 11/1981 | Dimmer | |
| 4,768,884 A | 9/1988 | Elkin | |
| 5,094,356 A | 3/1992 | Miller | |
| 5,845,799 A | 12/1998 | Deaton | |
| 5,924,758 A | 7/1999 | Dimmer | |
| 6,010,022 A | 1/2000 | Deaton | |
| 6,092,974 A | 7/2000 | Roth | |
| 6,120,233 A | 9/2000 | Adam | |
| 6,328,183 B1 | 12/2001 | Coleman | |
| 6,359,218 B1 * | 3/2002 | Koch et al. | 174/50 |
| 6,513,856 B1 | 2/2003 | Swanson | |
| 6,964,551 B1 | 11/2005 | Friesen | |
| 6,971,324 B1 | 12/2005 | Beck | |
| 6,994,039 B1 | 2/2006 | Beck | |
| 2002/0139817 A1 | 10/2002 | Travis | |
| 2004/0179929 A1 | 9/2004 | Van Mill | |
| 2005/0252999 A1 | 11/2005 | Truan | |
| 2006/0180062 A1 | 8/2006 | Furrer | |
| 2008/0197130 A1* | 8/2008 | Volkmann | 220/4.26 |

OTHER PUBLICATIONS

Seed Container Spec Sheet, RPP Containers, Cincinnati, OH.
Center Flow Bulk Container, brochure, Buckhorn, Inc.
Travis Seed Cart, web page, www.hitchdoc.com/travisseedcart.php, accessed Jul. 23, 2009.
PROBOX Seed Handling System, Pioneer Hi-Bred, www.pioneer.com, accessed Jul. 23, 2009.

* cited by examiner

*Primary Examiner* — Harry Grosso
(74) *Attorney, Agent, or Firm* — Jeffrey A. Proehl; Woods, Fuller, Shultz & Smith, P.C.

(57) ABSTRACT

An adaptable bulk material container system comprises a hopper having an interior for receiving the bulk material and an upper opening and a lower opening. The hopper comprises an upper portion defining an upper portion of the interior and including an upper perimeter wall about the interior. The hopper also includes a lower portion defining a lower portion of the interior and being positioned below the upper portion. The upper portion may be separable from the lower portion such that the upper portion is removable from the lower portion. The system also includes an adaptable base supporting the hopper, with the hopper being mounted on the adaptable base. The base comprises a support frame mounted on the hopper and extending downwardly from the hopper, with the support frame forming a perimeter about the lower portion of the hopper.

19 Claims, 12 Drawing Sheets

BULK MATERIAL CONTAINER WITH ADAPTABLE BASE

REFERENCE TO RELATED APPLICATIONS

This application is a continuation-in-part of U.S. patent application Ser. No. 12/512,442, filed Jul. 30, 2009, pending, which is hereby incorporated by reference in its entirety.

BACKGROUND

1. Field

The present disclosure relates to seed containers and more particularly pertains to a new bulk material container with an adaptable base for mounting the container on a variety of different support structures such as a seed cart.

2. Description of the Prior Art

Containers have been utilized for the packaging and delivery of seeds moving from the producer of the seed to the ultimate user of the seed, which is the farmer planting the seed in the field. Traditionally the containers were sacks or bags that required manual handling and were limited in the quantity of seed that could be held in each bag. More recently, containers have been developed that hold a greater bulk quantity of seeds moving from the producer to the farmer. The containers are typically designed to be sent back to the seed producer for reuse after the seed has been removed by the user. For this purpose, the containers are often designed with some degree of collapsibility in an attempt to minimize the size of the container during the return shipment of the empty container to the producer, while attempting to maximize the quantity of seed that may be held by the container. The weight of the container is sought to be reduced by utilizing plastic materials for the container.

Trailers or carts have been developed to carry one or more of these bulk containers into the field to a location proximate to the planter implement to facilitate the loading of the seed into the bins of the planter implement. These carts have structures that are specifically adapted for engaging and supporting the bulk containers, as the size and shape of the bulk containers varies, as do the structures on the carts used to support the containers.

SUMMARY

In view of disadvantages inherent in the known types of seed containers now present in the prior art, the present disclosure describes a new bulk material container with adaptable base which may be utilized for mounting the container on a variety of different support structures such as a seed cart.

The present disclosure relates to an adaptable bulk material container system for positioning on a seed cart. The container system comprises a hopper having an interior for receiving the bulk material. The hopper has at least one upper opening for receiving the bulk material into the interior and at least one lower opening for dispensing material from the interior. The hopper comprises an upper portion defining an upper portion of the interior, with the upper portion including an upper perimeter wall about the interior. The hopper further comprises a lower portion defining a lower portion of the interior, the lower portion being positioned below the upper portion. The upper portion may be separable from the lower portion such that the upper portion is removable from the lower portion. The container system also includes an adaptable base supporting the hopper, and the hopper is mounted on the adaptable base. The base comprises a support frame mounted on the hopper and extending downwardly from the hopper, with the support frame forming a perimeter about the lower portion of the hopper.

There has thus been outlined, rather broadly, some of the more important elements of the disclosure in order that the detailed description thereof that follows may be better understood, and in order that the present contribution to the art may be better appreciated. There are additional elements of the disclosure that will be described hereinafter and which will form the subject matter of the claims appended hereto.

In this respect, before explaining at least one embodiment or implementation in greater detail, it is to be understood that the scope of the disclosure is not limited in its application to the details of construction and to the arrangements of the components set forth in the following description or illustrated in the drawings. The disclosure is capable of other embodiments and implementations and is thus capable of being practiced and carried out in various ways. Also, it is to be understood that the phraseology and terminology employed herein are for the purpose of description and should not be regarded as limiting.

As such, those skilled in the art will appreciate that the conception, upon which this disclosure is based, may readily be utilized as a basis for the designing of other structures, methods and systems for carrying out the several purposes of the present disclosure. It is important, therefore, that the claims be regarded as including such equivalent constructions insofar as they do not depart from the spirit and scope of the present disclosure.

The advantages of the various embodiments of the present disclosure, along with the various features of novelty that characterize the disclosure, are disclosed in the following descriptive matter and accompanying drawings.

BRIEF DESCRIPTION OF THE DRAWINGS

The disclosure will be better understood and when consideration is given to the drawings and the detailed description which follows. Such description makes reference to the annexed drawings wherein.

DETAILED DESCRIPTION

With reference now to the drawings, and in particular to FIGS. 1 through 14 thereof, a new bulk material container with adaptable base embodying the principles and concepts of the disclosed subject matter will be described.

Figure 1:
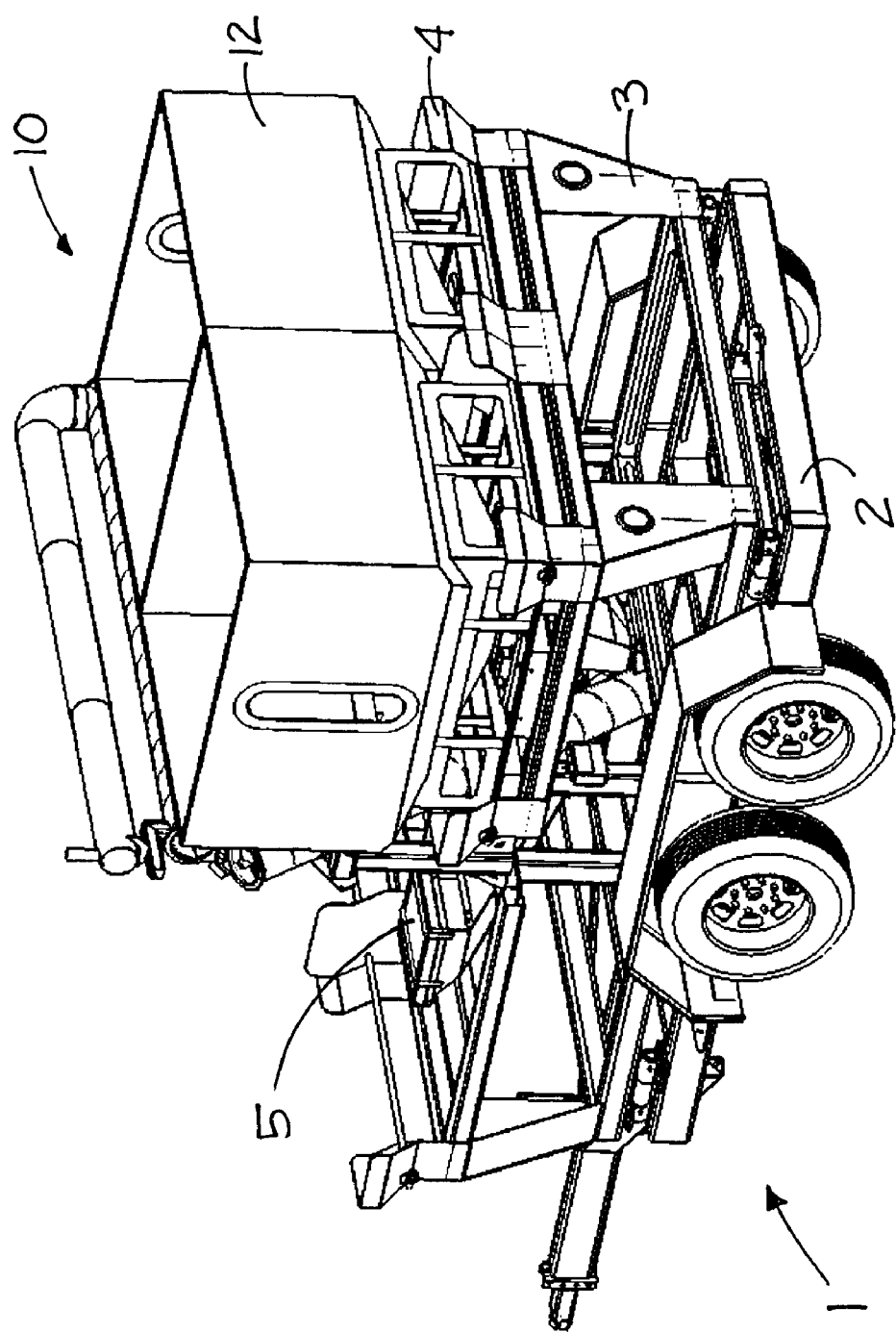
FIG. 1 is a schematic perspective view of a new bulk material container with adaptable base according to the present disclosure shown positioned on a seed transporting cart.
Figure 2:
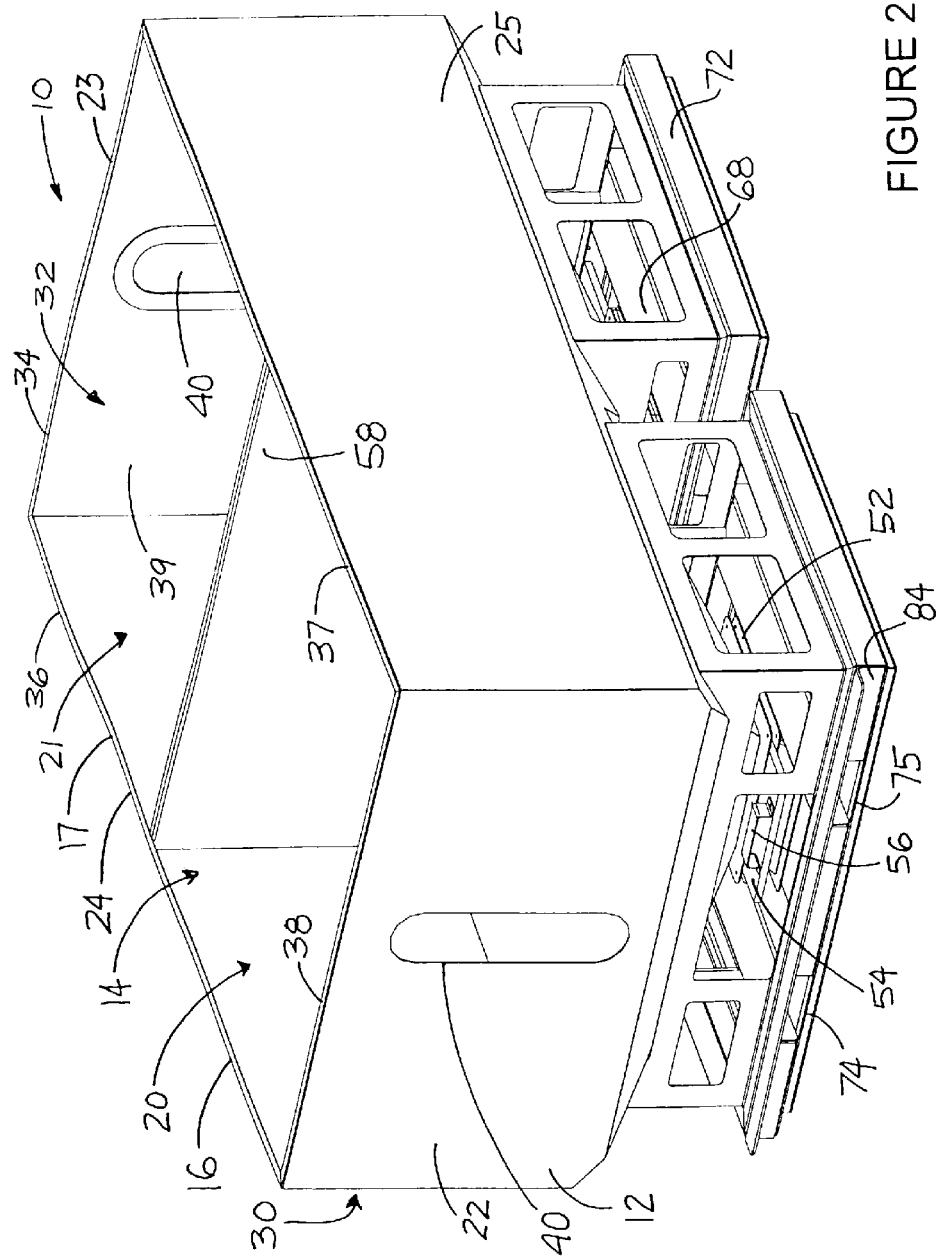
FIG. 2 is a schematic perspective view of the container according to an illustrative embodiment.
Figure 3:
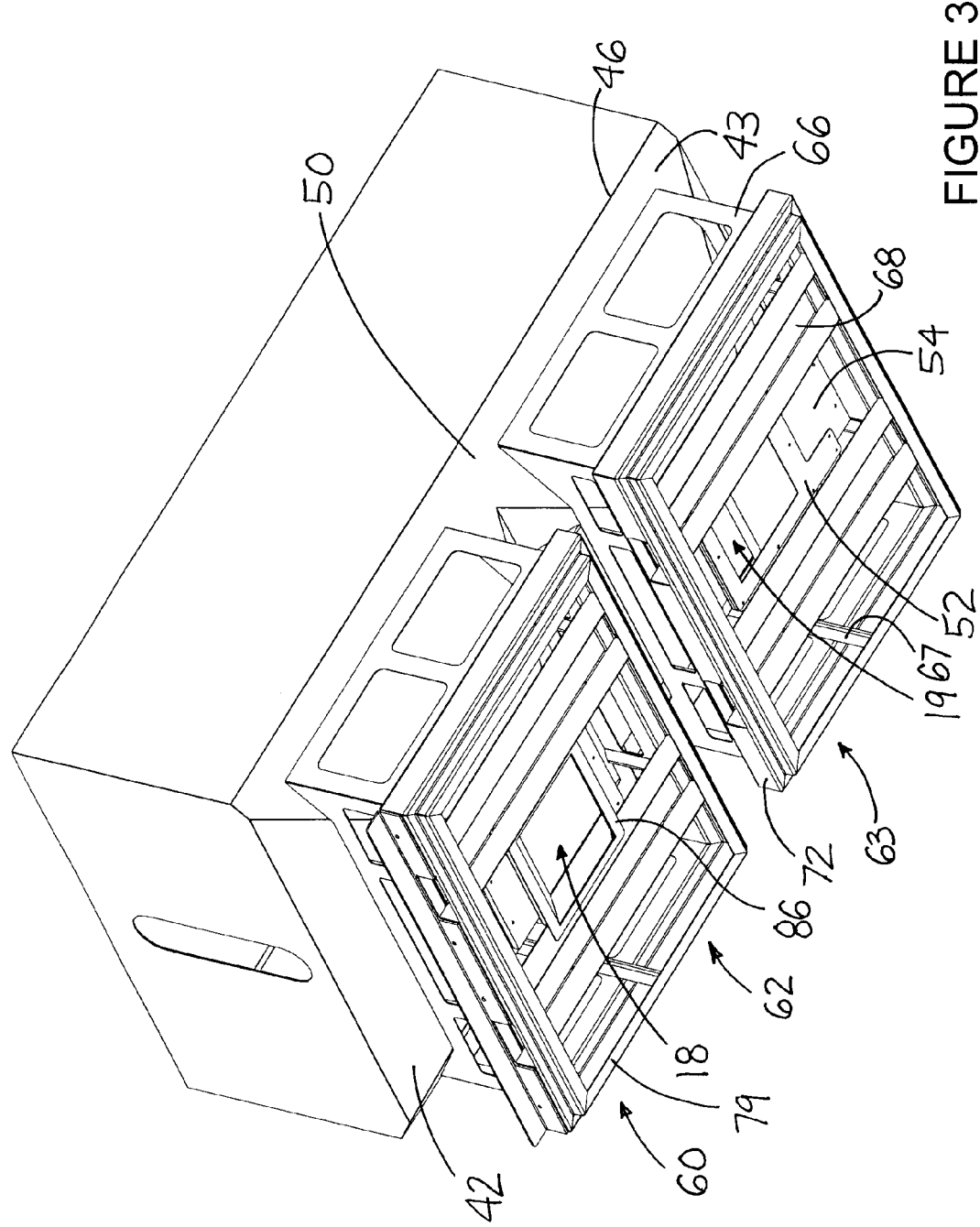
FIG. 3 is a schematic perspective view of the container of the illustrative embodiment.
Figure 4:
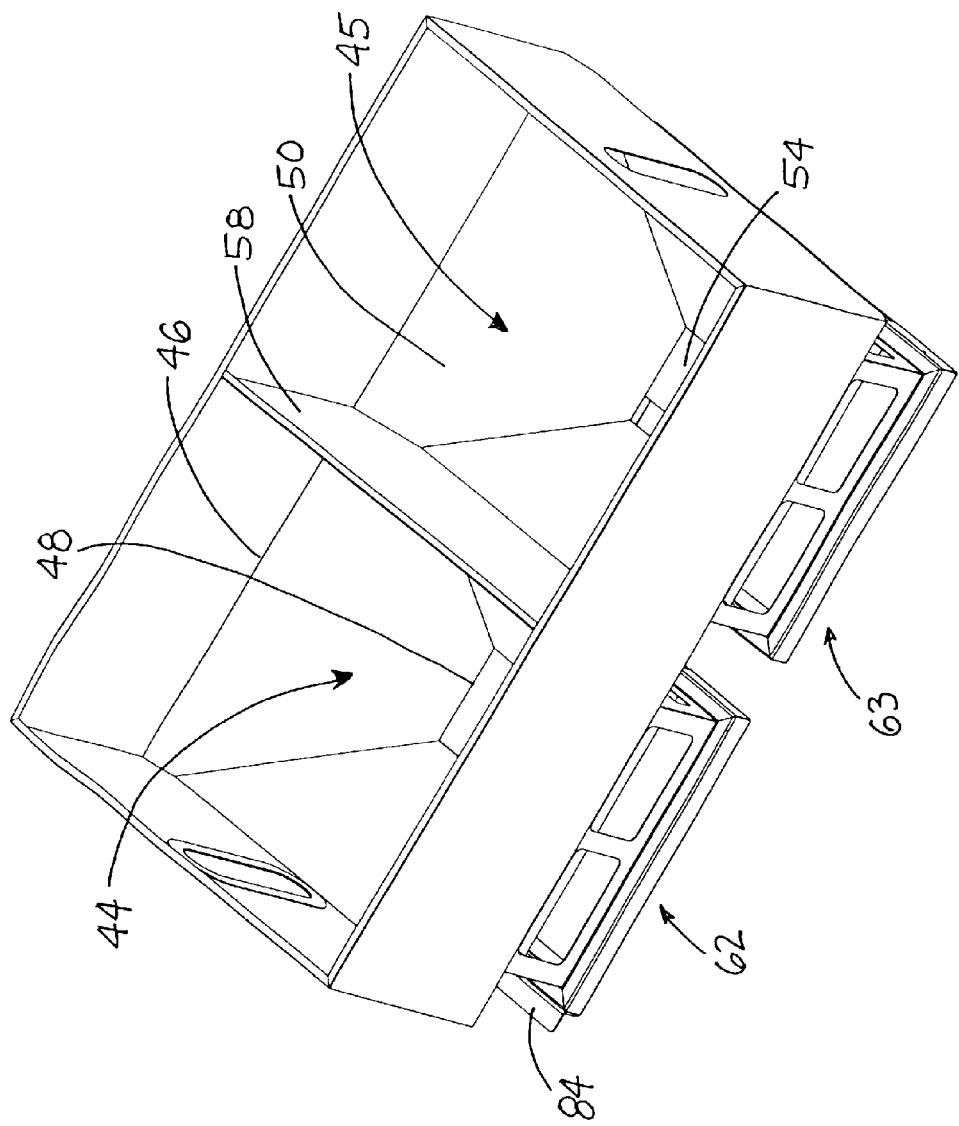
FIG. 4 is a schematic perspective view of the container of the illustrative embodiment.

In one aspect, the disclosure relates to an adaptable bulk material container 10 for containing a flowable material, such as seed but not necessarily limited to seed, as the container may be used with other materials of a small and granular character that may be relatively easy flowing or moving similar to a liquid, but substantially dry. The container 10 is highly suitable for positioning on a seed cart 1, such as is shown in FIG. 1 of the drawings. The illustrative seed cart 1 may take the form of a trailer that includes a trailer frame 2, wheels mounted on the frame, a riser frame 3 mounted or resting on the trailer frame, and one or more container engaging structures 4 that are mounted on the riser frame 3 and that engage spaced locations on a seed container. In the illustrative embodiment, the seed cart includes four seed container positions each capable of supporting a seed container, although more or fewer positions may be utilized, and includes four sets of container engaging structures 4. The seed cart 1 may include an apparatus 5 for collecting seed dispensed from the one or more containers situated on the riser frame 3 and the container engaging structures 5. The apparatus 5 may also include means for dispensing the collected seed into another location, such as the seed bin on a planter implement.

Turning to the container 10, which is shown in illustrative embodiments in the Figures, includes a hopper 12. The hopper has an interior 14 for receiving the bulk material, and may have at least one upper opening 16 for receiving the bulk material into the interior and at least one lower opening 18 for dispensing material from the interior. Significantly, the interior 14 of the hopper 12 may be bifurcated into two interior portions 20, 21 that may be separated from each other so that the interior portions are not in communication with each other, although the lack of communication between the interior portions is not critical. This feature permits the containment of two different types of seed in the single container 10 without intermixing of the seed types. Each of the interior portions 20, 21 has a respective upper opening 16, 17 and a respective lower opening 18, 19. Each of the lower openings 18, 19 may be substantially centered on the respective hopper portion, and may be alignable with a portion of the apparatus 5 of the cart 1 that is designed to collect the seed dispensed from a seed container. Each of the lower openings 18, 19 may thus simulate the bottom dispensing opening of a separate bulk seed container.

The hopper 12 may be elongated with opposite ends 22, 23 and opposite sides 24, 25. The hopper 12 may comprise an upper portion 30 that defines an upper portion 32 of the interior, and the upper portion 30 may include an upper perimeter wall 34 extending about and defining the upper portion 32 of the interior. The upper perimeter wall 34 may comprise a pair of side walls 36, 37 and a pair of end walls 38, 39, with the end walls extending between and joined to the side walls to form a closed perimeter. One preferred but not critical feature is a sight window 40 formed in the upper perimeter wall 34 to permit viewing of the interior of the portion of the hopper. The sight window 40 may be formed in one of the end walls, and may be located in both of the end walls 38, 39 of the upper perimeter wall 34. The sight window 40 may be elongated in a vertical direction to provide a view of the level of the seed in the hopper.

The hopper 12 may also include a lower hopper portion 42 that defines a lower interior portion 44, with the lower interior portion being positioned below the upper interior portion 32. The lower hopper portion 42 may have a top 46 and a bottom 48, with the top being positioned adjacent to and in communication with the upper interior portion 32.

The lower portion 42 of the hopper 12 may be bifurcated and include two lower hopper portions 42, 43 with two respective lower interior portions 44, 45. Each of the lower hopper portions 42, 43 may comprise a lower perimeter wall 50 that may be configured such that the lower interior portions 44, 45 taper smaller in horizontal cross section toward the bottom 48 of the lower portion and toward the lower opening 18, 19 to thereby guide the contents of the hopper toward the opening.

In some embodiments, the hopper 12 has a mounting flange 52 mounted on the lower hopper portion 42, 43. The mounting flange 52 may be mounted on at least one, and preferably both, of the lower perimeter walls 50 of the lower hopper portions. Each mounting flange 52 may extend about one of the lower openings 18, 19. The mounting flange 52 may include a plurality of mounting structures, such as holes for receiving fasteners, for mounting various optional adapting structures onto the hopper 12.

The hopper 12 may further comprise a closing member 54 that is configured to selectively open and close a respective one of the lower openings 18, 19 of the hopper. The closing member 54 may thus be movable between an open position that allows contents of the hopper interior to pass through the lower opening, and a closed position that blocks movement of the hopper contents out of the lower opening. The closing member 54 may be mounted on each of the lower hopper portions 42, 43 and may be slidable between the open and closed positions. A handle 56 may be mounted on the closing member 54 to facilitate hand actuation of the closing member between the open and closed positions.

The hopper 12 may further comprise a divider wall 58 that is positioned between the interior portions 20, 21 to separate the interior portions from each other. The divider wall 58 may extend between the side walls 36, 37 of the upper perimeter wall 34, and may terminate at the top 46 of the lower hopper portion 42, 43, and at the juncture of the lower hopper portions. The divider wall 58 may be solid, but could also be porous to permit exchange of the contents of the first and second interior portions 20, 21. Further, at least one linking gusset 59 may join the pair of lower perimeter walls 50 of the lower hopper portions 42, 43, and a pair of the gussets may be employed to strengthen the hopper 12.

The container 10 may further include an adaptable base 60 that supports the hopper 12 on a surface, such as on the riser frame of the seed cart. As will become apparent in the following description, the adaptable base 60 is easily adapted to conform to the different configurations of different types of seed carts, as well as other apparatus into which seed may need to be dispensed. The hopper 12 is mounted on the adaptable base, and may be permanently mounted on the base although other types of mounting may be employed. In a significant aspect of the container 10, the adaptable base 60 may include two substantially separate base portions 62, 63, with each of the base portions supporting one of the lower hopper portions 42, 43 and the respective lower perimeter wall 50. The base portions 62, 63 may be spaced from each in the longitudinal direction of the hopper 12. The two base portion configuration of the adaptable base 60 permits the adaptable base to occupy two positions on the seed cart that would otherwise be occupied by two individual seed containers.

Each of the base portions 62, 63 of the base 60 may include a support frame 64 that is mounted on the hopper 12 and extends downwardly from the hopper. Each support frame 64 may form a perimeter about one of the lower hopper portions 42, 43 and about the respective lower opening 18, 19. The support frame 64 may be physically separate from (but connected to) the lower perimeter wall 50 to provide support to the lower perimeter wall.

The support frames 64 may each have a perimeter area that is smaller than a perimeter area of the upper portion 16 of the hopper, and the support frame 64 may have a width that is less than the width between the side walls 36, 37 of the upper perimeter wall 34, such that the support frame is inset from the upper hopper portion 30. The support frame 64 may include structure including a perimeter skirt 66, a plurality of vertical stanchions 67 positioned along the perimeter skirt, and horizontal channel members 68 that extend across the perimeter skirt in a longitudinal direction of the container 10, although the presence of these elements is not critical to the functionality of the container and could have different forms.

Each of the base portions 62, 63 may further comprise a support flange that is mounted on the support frame 64, and may extend outwardly from the support frame. The support flange provides one mounting point for adapting structure that adapts the container for use with different transport apparatus, such as different styles of seed carts. The support flange 70 may have an outer perimeter surface 72 which may be substantially vertically oriented. The outer perimeter surface 72 may extend along at least three sides of the support flange, and in the illustrative embodiments extends along all four sides of the support frame and flange. The outer perimeter surface 72 of the support flange may define a perimeter that is less than the perimeter defined by the upper perimeter wall 34 of the hopper 12. The outer perimeter surface 72 of the support flange may define a perimeter that is greater than the perimeter defined by the support frame 64, such that the support frame is inset from the support flange.

The container 10 may include a pair of fork apertures 74, 75 for receiving forks or tines of a fork-lifting apparatus. The fork apertures 74, 75 may be located on the support flange 70, and may be located on an end of the hopper. The fork apertures may be positioned in communication with the channel members 68 to provide a guide and support for the forks inserted through the apertures 74, 75. The fork apertures may be positioned on opposite sides of the lower opening 18 of the hopper. In some embodiments, the fork apertures 74, 75 may be located at a vertical level below the vertical level of the lower opening 18 of the hopper. The fork apertures 74, 75 may be located in the outer perimeter surface 72 of the support flange. The support flange 70 may also include a plurality of mounting holes 76 arranged along the outer perimeter surface of the flange.

Each of the base portions 62, 63 may include a lower lip 78 positioned below the support flange 70, and may extend downwardly from the support flange 70. The lower lip 78 may form a lower resting surface 79 for the container 10, and the lower lip may function to raise the support flange 70 above a plane of the lower resting surface 79, and the surface upon which the lower resting surface is rested. The lower lip 78 my also be horizontally inset from the outer perimeter surface 72 of the support flange.

Figure 5:
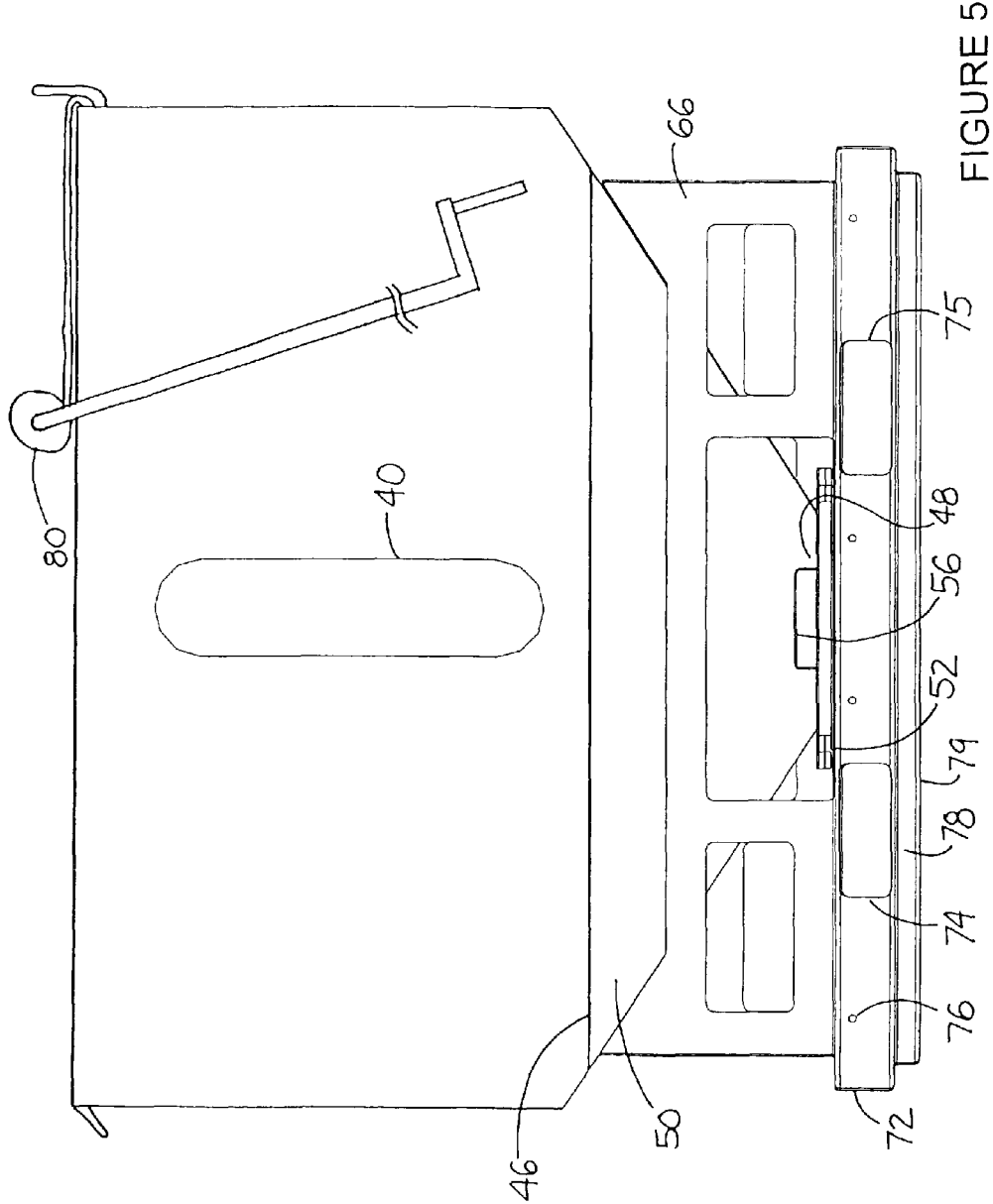
FIG. 5 is a schematic end elevation view of the container of the illustrative embodiment, and shows an embodiment of a cover for the hopper.
Figure 6:
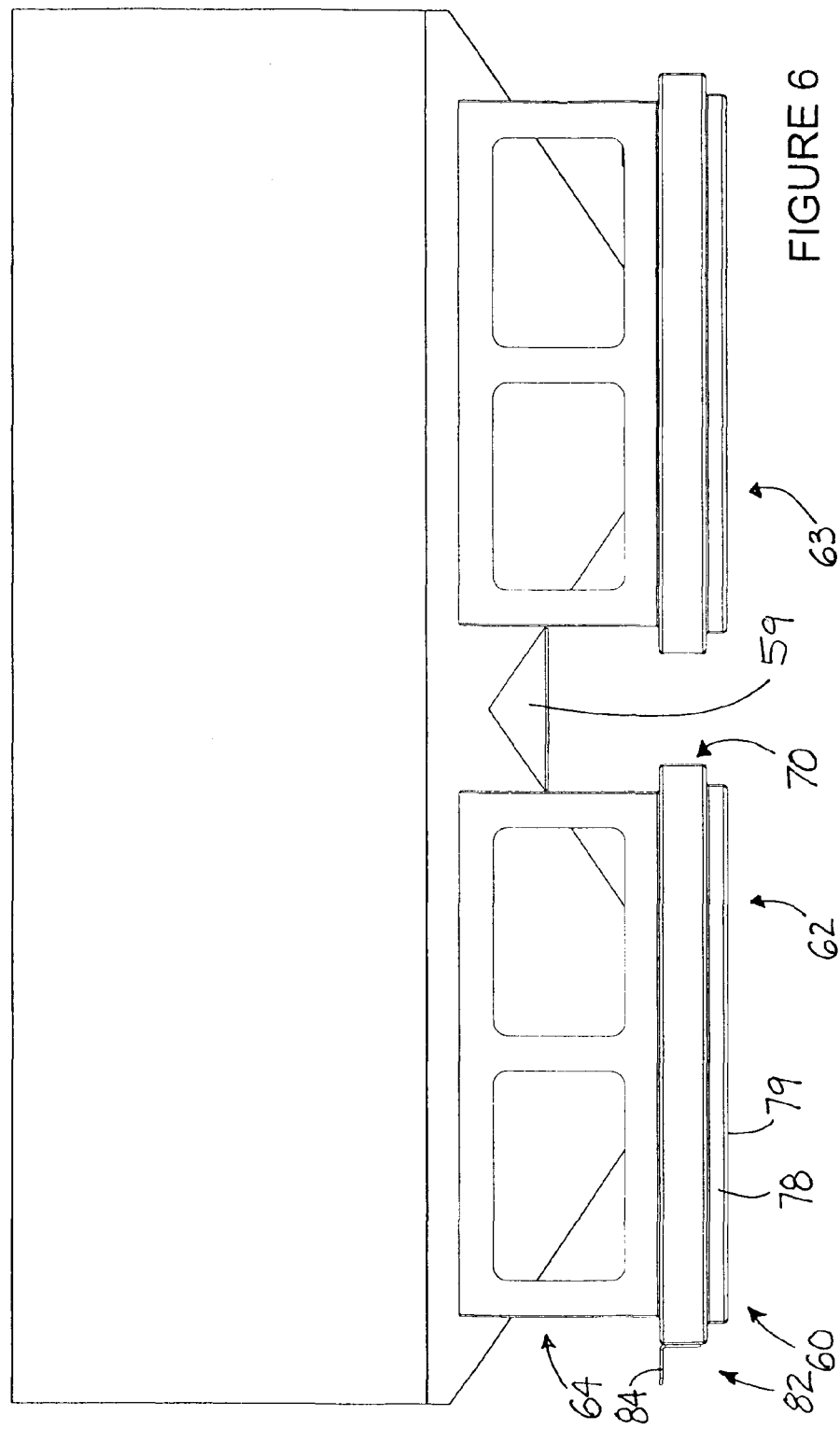
FIG. 6 is a schematic side elevation view of the container of the illustrative embodiment.
Figure 7:
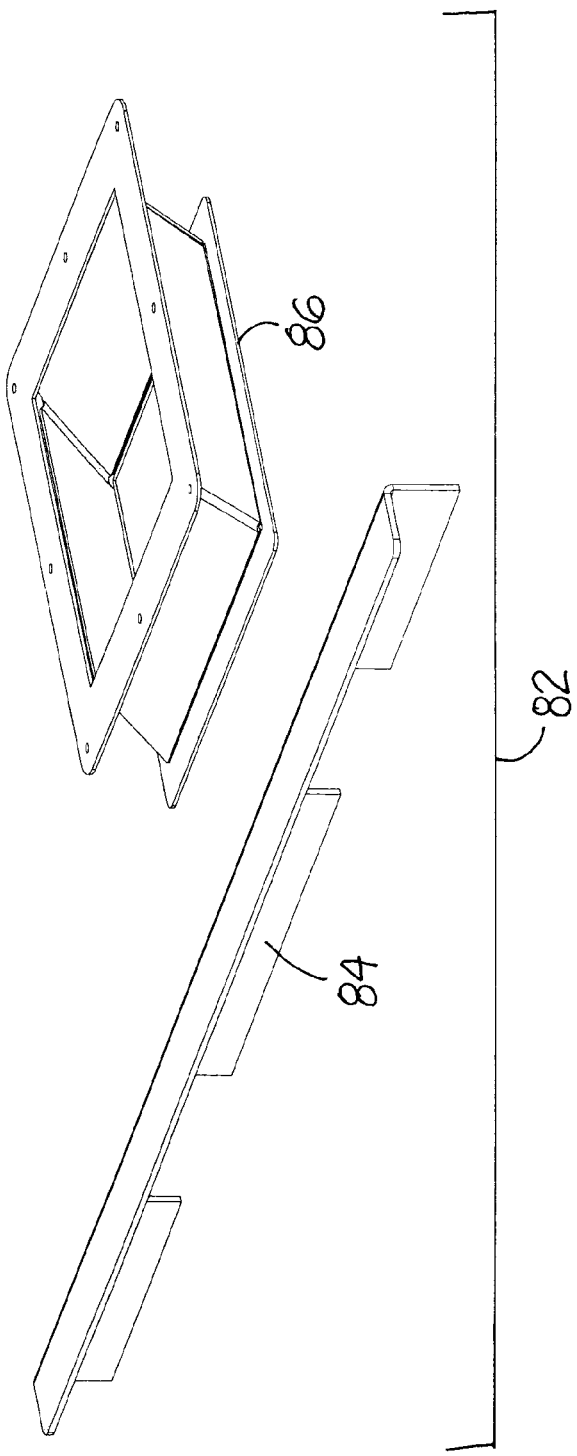
FIG. 7 is a schematic perspective view of the one embodiment of an adapter assembly for the container of the illustrative embodiment.
Figure 8:
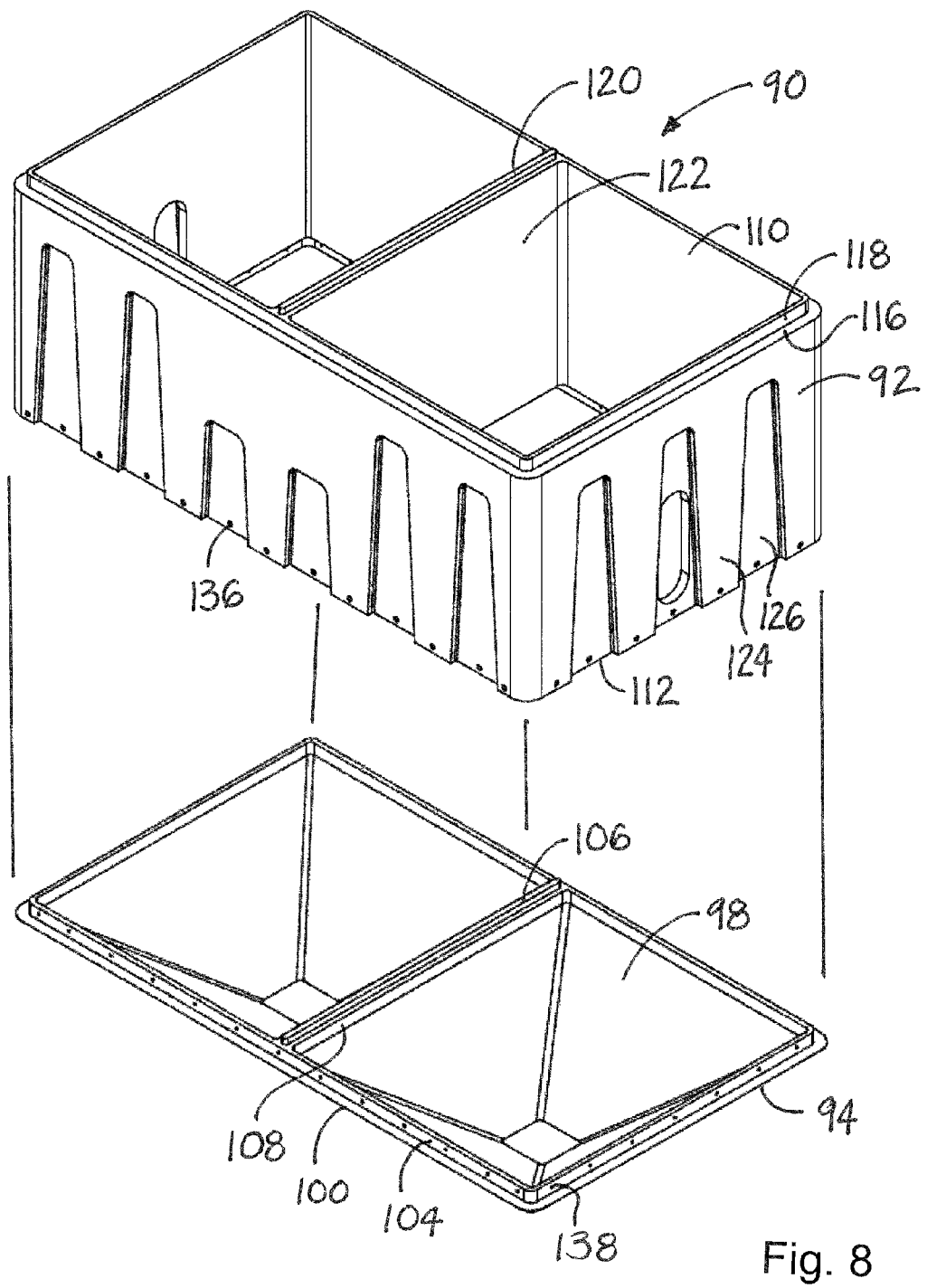
FIG. 8 is a schematic exploded perspective view of an embodiment of the hopper with optional features.
Figure 9:
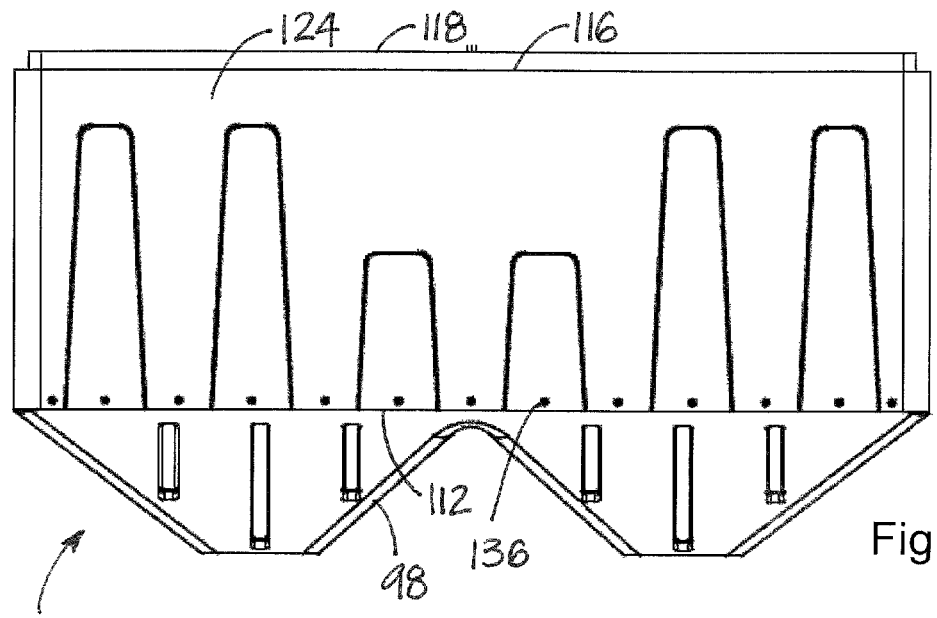
FIG. 9 is a schematic side view of the embodiment with optional features.
Figure 10:
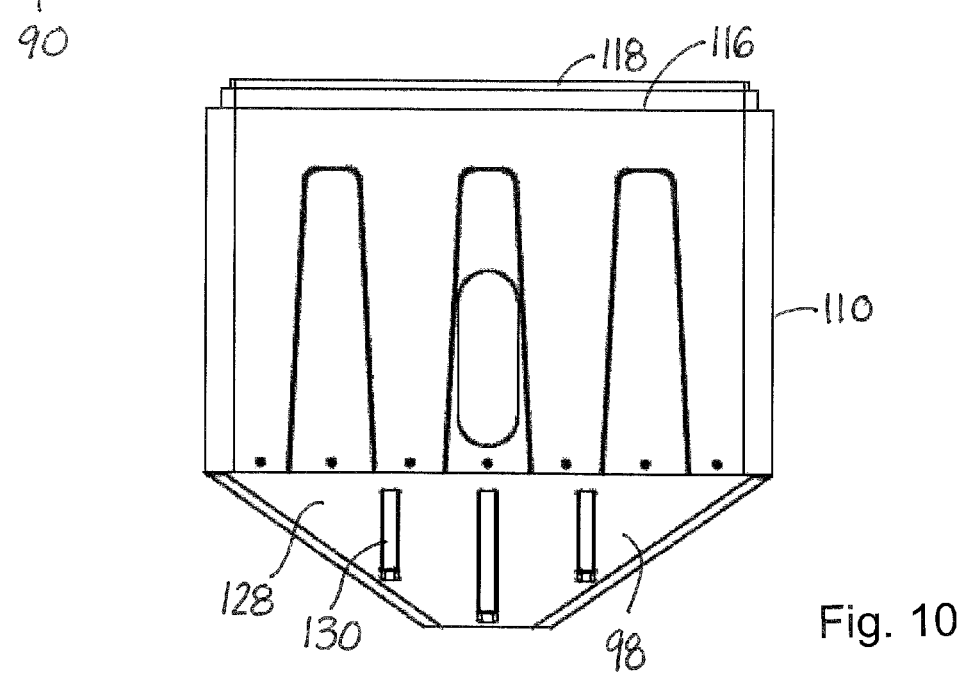
FIG. 10 is a schematic end view of the embodiment with the optional features.
Figure 11:
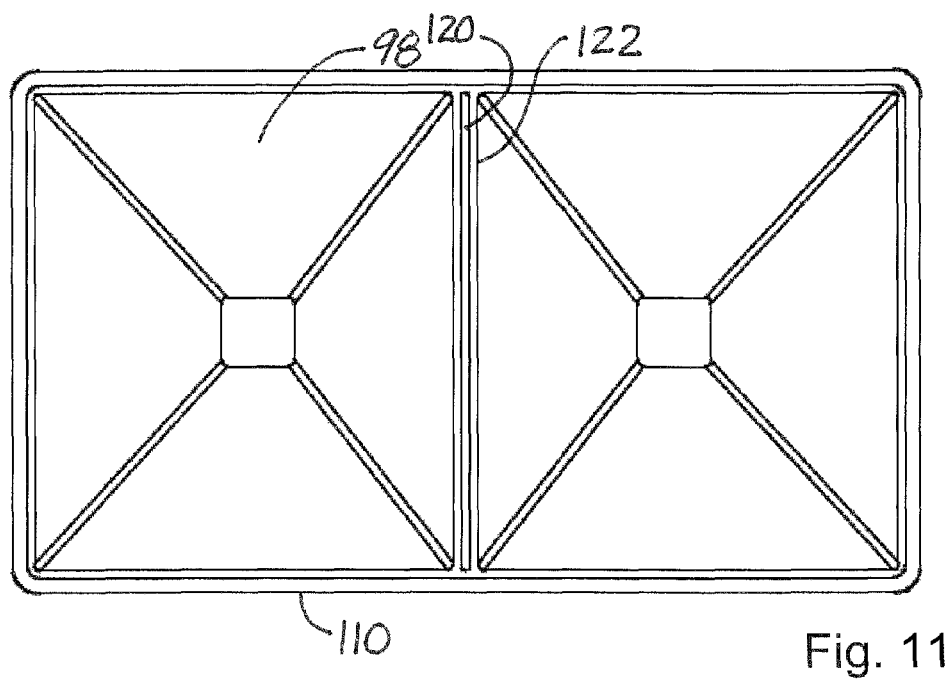
FIG. 11 is a schematic top view of the embodiment with the optional features.
Figure 12:
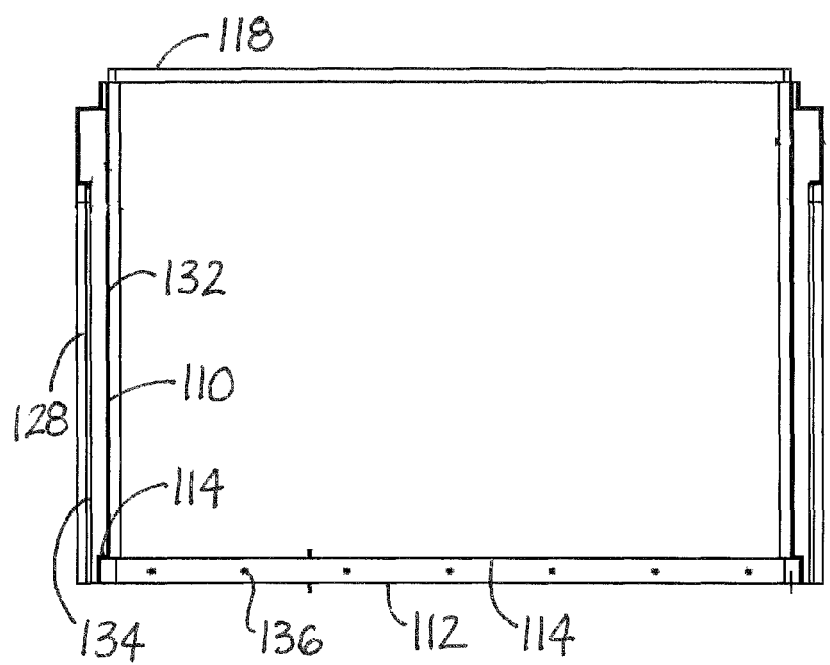
FIG. 12 is a schematic sectional view of the upper portion of the hopper.
Figure 13:
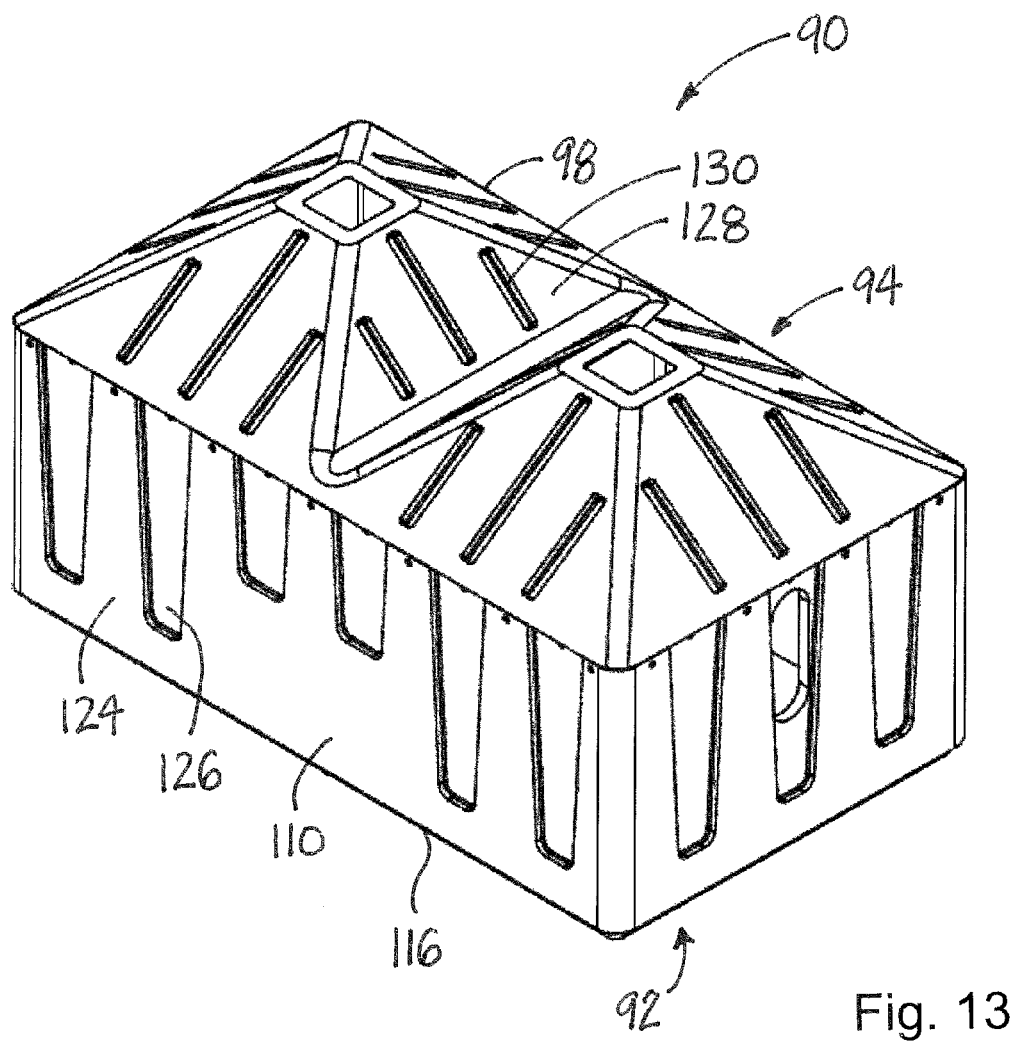
FIG. 13 is a schematic perspective view of the embodiment with optional features in an inverted portion to show detail of the bottom of the hopper.
Figure 14:
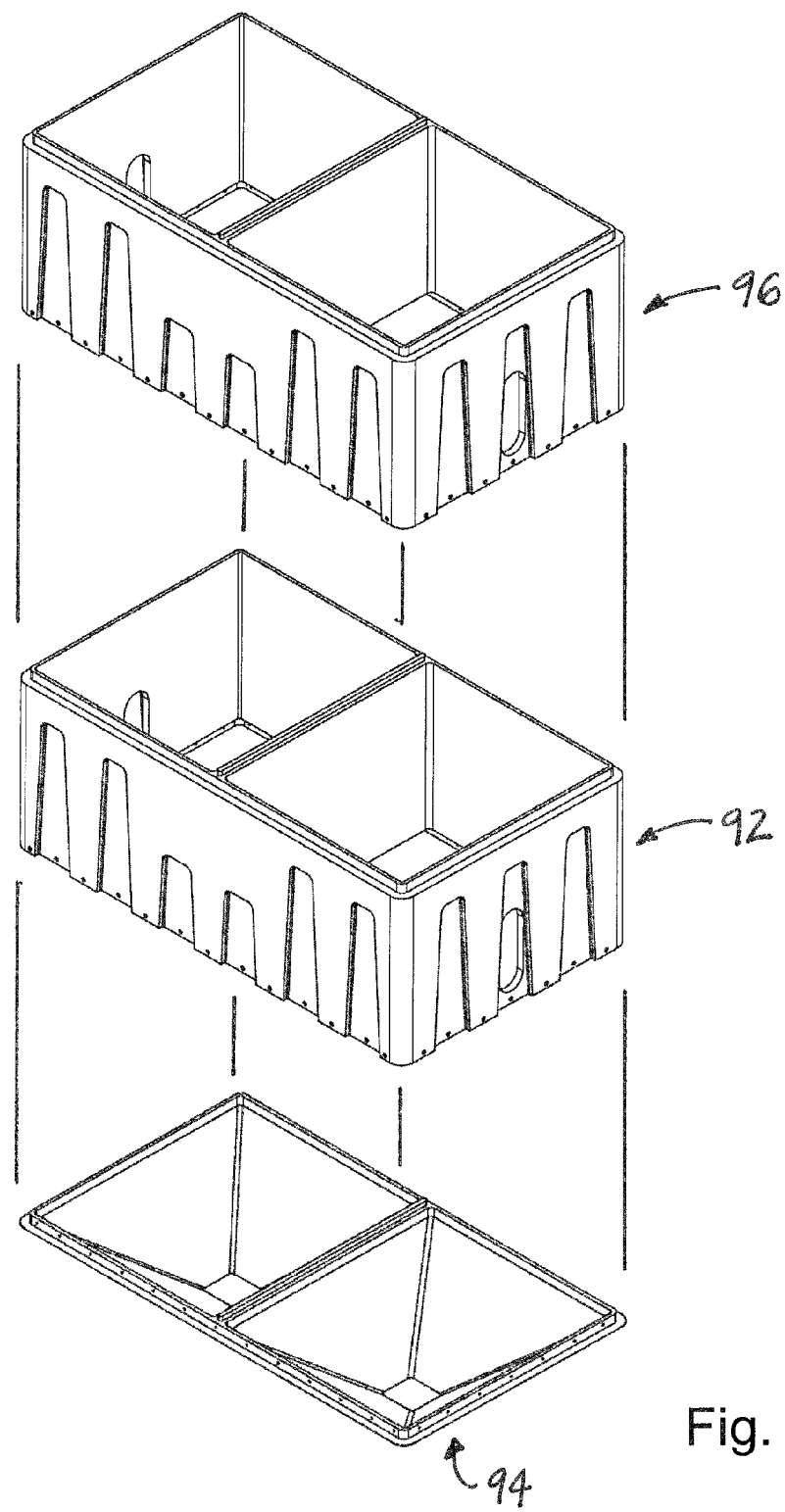
FIG. 14 is a schematic exploded perspective view of an embodiment of the hopper with two upper portions and a lower portion.

The container 10 may also comprise a cover 80 that is configured to selectively cover the upper openings 16, 17 of the hopper 12 (see FIG. 5). The cover 80 may be movable between a cover position in which the openings are at least substantially covered, and an uncovered position in which the openings are at least substantially uncovered. In some embodiments, the cover 80 may comprise a flexible sheet of material that is retracted into a roll in the uncovered position and extended from the roll in the cover position. The roll of the cover may be moved from one side of the hopper to the other side of the hopper by rotating a crank arm in a first direction to unroll, and rotating in a second direction to roll up the sheet of material. One suitable cover is disclosed in U.S. Pat. No. 4,302,043, which is hereby incorporated by reference in its entirety. However, other cover configurations may also be employed.

The container 10 may further comprising an adapter assembly 82 for adapting the base 60, and the support flange 70, to engage a particular mounting structure on a seed cart. While no specialized adapter assembly 82 is necessary to mount the container on the seed cart 1 depicted in FIG. 1, other seed cart designs may require different interfaces for use with the container 10. In one illustrative embodiment, the adapter assembly 82 comprises an adapter member 84 that is mountable on the support flange 70, and may be fastened to the support flange using fasteners inserted through the adapter member 84 and into the mounting holes 76 of the support flange, although other mounting techniques could be used. The adapter member 84 may be elongated in shape, and may have an L-shaped cross sectional shape. One of the legs of the L-shaped adapter member 84 may extend outwardly from the support flange 70 to extend the extent of the support flange in a horizontal direction.

Further, the adapter assembly 82 may provide an adaptation of the seed dispensing structure of the container 10 for particular seed cart designs. While no adaptation is necessary in the seed dispensing structure for the seed cart depicted in FIG. 1, other types of seed carts may not have, for example, seed receiving means that are located at a substantially central location on the hopper portion. For example, a shown in the Figures, the adapter assembly 82 may include a chute extension 86 that is mountable on the lower hopper portion 42, 43 of the hopper in communication with the lower opening 18, 29 of the hopper, and may be mountable on the mounting flange 52. The chute extension 86 may have a top opening and a bottom opening, and in some embodiments the center of the top opening is offset from the center of the bottom opening, so that the seed exiting the lower opening of the hopper is moved in a lateral direction from the lower opening before being dispensed from the chute extension.

Other possible features of the hopper of the container 10 are shown in the embodiments of FIGS. 8 through 14 of the drawings. A hopper 90 includes an upper portion 92 that is separable from the lower portion 94 such that the upper portion is selectively removable from the lower portion, and also so that additional upper portions may be added on top of the upper portion. For example, the upper portion 92 may be a first upper portion, and a second upper portion 96 may be removably stackable on the first upper portion 92 to increase the volume of the interior of the hopper. The first and second upper portions may be substantially identical and interchangeable, or may vary in some respect, such as in the height of the portions. The lower portion 94 may be mounted on an adaptable base such as has been described in this disclosure in a permanent or separable manner.

The upper and lower portions may be suitably configured to permit secure stacking of the portions in a reconfigurable fashion, although more permanent mountings may also be possible. The lower portion has lower perimeter walls 98 with an upper edge 100, and a lower ridge 104 may be formed on and extend upwardly from the upper edge 100. The lower ridge 104 may extend along at least a portion of the lower perimeter walls, and in some preferred embodiments extends substantially continuously along the entire perimeter of the lower portion. A segment 106 of the lower ridge may be formed on the top of the divider 108 on the lower portion.

The upper portion 92 has an upper perimeter wall 110 has a lower edge 112, and a shoulder 114 may be formed on the lower edge 112 to engage the lower ridge 104 on the upper edge 100 of the lower perimeter wall (or the ridge on the upper perimeter wall described herein). The lower ridge 104 on the upper edge 100 may be tucked inside of the shoulder 114 of the lower edge 112 when the upper portion 92 is mounted on the lower portion 94. The lower edge of the divider 122 of the upper portion may have a channel (not shown) of complementary size, shape and position to receive a portion of the segment 106 of the lower ridge.

The upper perimeter wall 110 also has an upper edge 116, and an upper ridge 118 may be formed on the upper edge. The upper ridge 118 may extend along at least a portion of the upper perimeter wall 110, and in some preferred embodiments extends substantially continuously along the entire perimeter of the upper portion. A segment 120 of the upper ridge may be formed on the top of the divider 122 on the upper portion.

The upper perimeter wall 110 has an outer surface 124, and in some embodiments the outer surface has a plurality of inset ribs 126. The lower perimeter wall 98 has an outer surface 128, and may also have a plurality of inset ribs 130. in some embodiments, the upper perimeter walls 110 may be formed of an inner wall panel 132 and an outer wall panel 134 connected together toward the upper edge 116 and the lower edge 112. The upper portion 92 may comprise a single molded piece and the lower portion 94 may also comprise a single molded piece. The side walls of the upper perimeter wall 110 may be substantially uniformly spaced between the top and the bottom of the upper portion.

In some embodiments, a plurality of attachment apertures 136 are formed in the upper perimeter wall 110 in positions adjacent to and along the lower edge 112 of the upper perimeter wall. Also, a plurality of attachment apertures 138 may be formed in the ridge 104 on the lower perimeter wall 98 in positions that substantially correspond to the positions of the attachment apertures 136 in the upper perimeter wall, so that fasteners or other elements may be inserted through aligned apertures 136, 138.

It should be appreciated from the foregoing description that, except when mutually exclusive, the features of the various embodiments described herein may be combined with features of other embodiments as desired while remaining within the intended scope of the disclosure.

With respect to the above description then, it is to be realized that the optimum dimensional relationships for the parts of the disclosed embodiments and implementations, to include variations in size, materials, shape, form, function and manner of operation, assembly and use, are deemed readily apparent and obvious to one skilled in the art in light of the foregoing disclosure, and all equivalent relationships to those illustrated in the drawings and described in the specification are intended to be encompassed by the present disclosure.

Therefore, the foregoing is considered as illustrative only of the principles of the disclosure. Further, since numerous modifications and changes will readily occur to those skilled in the art, it is not desired to limit the disclosed subject matter to the exact construction and operation shown and described, and accordingly, all suitable modifications and equivalents may be resorted to that fall within the scope of the claims.

I claim:

1. An adaptable bulk material container system for positioning on a seed cart, the container system comprising:
   a hopper having an interior for receiving the bulk material, the hopper having at least one upper opening for receiving the bulk material into the interior and at least one lower opening for dispensing material from the interior, the hopper comprising:
      an upper portion defining an upper portion of the interior, the upper portion including an upper perimeter wall about the interior;
      a lower portion defining a lower portion of the interior, the lower portion being positioned below the upper portion;
      wherein the upper portion is separable from the lower portion such that the upper portion is removable from the lower portion; and
   an adaptable base supporting the hopper, the hopper being mounted on the adaptable base, the base including a support frame mounted on the hopper and extending downwardly from the hopper, the support frame forming a perimeter about the lower portion of the hopper;
   wherein the upper portion of the interior of the hopper is separated into two interior compartments by an upper divider wall and the lower portion of the interior of the hopper is separated into two interior compartments, each of the interior compartments of the upper portion being in communication with a respective one of the interior compartments of the lower portion.

2. The container system of claim 1 wherein the upper portion comprises a first upper portion, and additionally comprising a second upper portion removably stacked on the first upper portion to increase a volume of the interior of the hopper.

3. The container system of claim 1 wherein the lower portion has a lower perimeter wall with an upper edge, a lower ridge being formed on and extending upwardly from the upper edge.

4. The container system of claim 3 wherein the upper perimeter wall of the upper portion has a lower edge, a shoulder being formed on the lower edge to form an indentation in the lower edge above a bottom of the upper perimeter wall to receive the ridge on the upper edge of the lower perimeter wall.

5. The container system of claim 4 wherein the ridge on the upper edge of the lower perimeter wall and the indentation on the lower edge of the upper perimeter wall are configured such that the ridge is able to be tucked inside of the indentation under the shoulder of the lower edge of the upper perimeter wall when the upper portion is stacked on the lower portion.

6. The container system of claim 5 wherein a plurality of attachment apertures are formed in the upper perimeter wall of the upper portion in positions adjacent to and along a lower edge of the upper perimeter wall, and a plurality of attachment apertures are formed in the ridge on the lower perimeter wall of the lower portion in positions corresponding to the positions of the attachment apertures in the upper perimeter wall.

7. The container system of claim 4 wherein the upper perimeter wall of the upper portion has an upper edge, an upper ridge being formed on the upper edge of the upper perimeter wall.

8. The container system of claim 1 wherein the base includes a support flange mounted on the support frame and extends outwardly from the support frame and has an outer perimeter surface, and additionally comprising an adapter assembly for adapting the support flange to engage mounting structure on a seed cart.

9. The container system of claim 8 wherein the adapter assembly comprises an adapter member mountable on the support flange to increase a horizontal size of the support flange.

10. The container system of claim 8 wherein the adapter assembly comprises a chute extension mountable on the lower portion of the hopper in communication with the lower opening of the hopper.

11. The container system of claim 10 wherein the chute extension has a top opening and a bottom opening, a center of the top opening being offset from a center of the bottom opening.

12. An adaptable bulk material container system for positioning on a seed cart, the container system comprising:
   a hopper having an interior for receiving the bulk material, the hopper having at least one upper opening for receiving the bulk material into the interior and at least one lower opening for dispensing material from the interior, the hopper comprising:
      an upper portion defining an upper portion of the interior, the upper portion including an upper perimeter wall about the interior;
      a lower portion defining a lower portion of the interior, the lower portion being positioned below the upper portion;
      wherein the upper portion is separable from the lower portion such that the upper portion is removable from the lower portion; and
   an adaptable base supporting the hopper, the hopper being mounted on the adaptable base, the base including a support frame mounted on the hopper and extending downwardly from the hopper, the support frame forming a perimeter about the lower portion of the hopper;
   wherein the adaptable base including two base portions, each of the base portions supporting a lower perimeter wall of the lower portion of the hopper.

13. The container system of claim 8 wherein the support flange defines a pair of fork apertures for receiving forks of a fork-lifting apparatus.

14. The container system of claim 1 additionally comprising a cover configured to selectively cover the upper opening of the hopper, the cover being movable between a cover position and an uncovered position.

15. The container system of claim 1 wherein the interior compartments of the lower portion of the hopper taper smaller in size toward the lower opening for each interior compartment.

16. The container system of claim 1 wherein one of the interior compartments of the upper portion is positioned beside another one of the interior compartments.

17. The container system of claim 1 wherein the upper perimeter wall and the upper divider wall are formed as a single piece.

18. The container system of claim 1 wherein the lower perimeter wall is formed as a single piece.

19. An adaptable bulk material container system for positioning on a seed cart, the container system comprising:
   a hopper having a pair of interior compartments for each holding bulk material, each of the interior compartments having an upper opening for receiving material into the compartment and a lower opening for dispensing material from the compartment, the hopper comprising an upper portion defining upper portions of the interior compartments and a lower portion defining lower portions of the interior compartments, the upper portion including an upper perimeter wall and the lower portion including a lower perimeter wall, the upper perimeter wall of the upper portion being separable from the lower perimeter wall of the lower portion such that the upper portion is removable from the lower portion; and
   an adaptable base mounted on the lower portion of the hopper to support the lower portion and the upper portion of hopper, the base including a support frame mounted on the hopper and extending downwardly from the hopper, the support frame forming a perimeter about each of the lower openings of the interior compartments.

* * * * *